United States Patent [19]

Kruger

[11] Patent Number: 5,385,422

[45] Date of Patent: Jan. 31, 1995

[54] PIVOT/ROTATIONAL DEVICE

[75] Inventor: Ronald D. Kruger, Grand Blanc, Mich.

[73] Assignee: Chrysler Corporation, Highland Park, Mich.

[21] Appl. No.: 14,929

[22] Filed: Feb. 8, 1993

[51] Int. Cl.[6] .............................................. F16C 11/00
[52] U.S. Cl. ................................ 403/371; 29/898.055; 29/898.059; 384/275; 384/276; 384/296
[58] Field of Search ........................ 384/276, 275, 296; 29/898.059, 898.054, 898.055, 898.042, 898, 898.047; 403/93, 108, 109, 371

[56] References Cited

U.S. PATENT DOCUMENTS

| | | | |
|---|---|---|---|
| 149,284 | 4/1874 | Baker | 29/898.059 X |
| 1,758,712 | 5/1930 | Morris | 384/296 |
| 1,957,087 | 5/1934 | Viberg . | |
| 2,266,320 | 12/1941 | Hobbs | 384/276 |
| 2,546,801 | 3/1951 | Visone . | |
| 2,582,516 | 1/1952 | Williams . | |
| 3,298,241 | 1/1967 | Rise . | |
| 3,415,580 | 12/1968 | Malmsten . | |
| 3,782,797 | 1/1974 | Lange et al. . | |
| 4,047,771 | 9/1977 | Vaughn et al. | 384/276 |
| 4,088,858 | 5/1978 | Kramer . | |
| 4,251,182 | 2/1981 | Schroeder | 384/276 X |
| 4,582,435 | 4/1986 | Davis . | |
| 4,633,733 | 1/1987 | Tavener . | |
| 4,762,015 | 8/1988 | Katayama . | |
| 4,917,509 | 4/1990 | Takano | 384/296 X |

FOREIGN PATENT DOCUMENTS

| | | | |
|---|---|---|---|
| 21689 | 2/1936 | Australia | 384/276 |
| 934803 | 11/1955 | Germany | 384/276 |
| 2146708 | 4/1985 | United Kingdom | 384/276 |

*Primary Examiner*—Randolph A. Reese
*Assistant Examiner*—Christopher J. Novosad
*Attorney, Agent, or Firm*—Edward A. Craig

[57] ABSTRACT

A pivot/rotational device comprises a pivot pin having a head and a tubular, cylindrical shank of reduced diameter projecting from the head. A two-part bushing assembly comprises a ring and a sleeve. The ring encircles the shank. The sleeve is formed of anti-friction material and is disposed concentrically between and in surface-to-surface contact with the ring and the shank. The sleeve has a radially outwardly extending collar at one end disposed between and in surface-to-surface contact with the head and one end of the ring. The tubular shank has an open end opposite the head provided with a radially outwardly extending flange which overlies the other end of the ring. The ring is restrained from axial movement between the collar and the flange. The sleeve may also have a second collar between the flange and the ring.

2 Claims, 1 Drawing Sheet

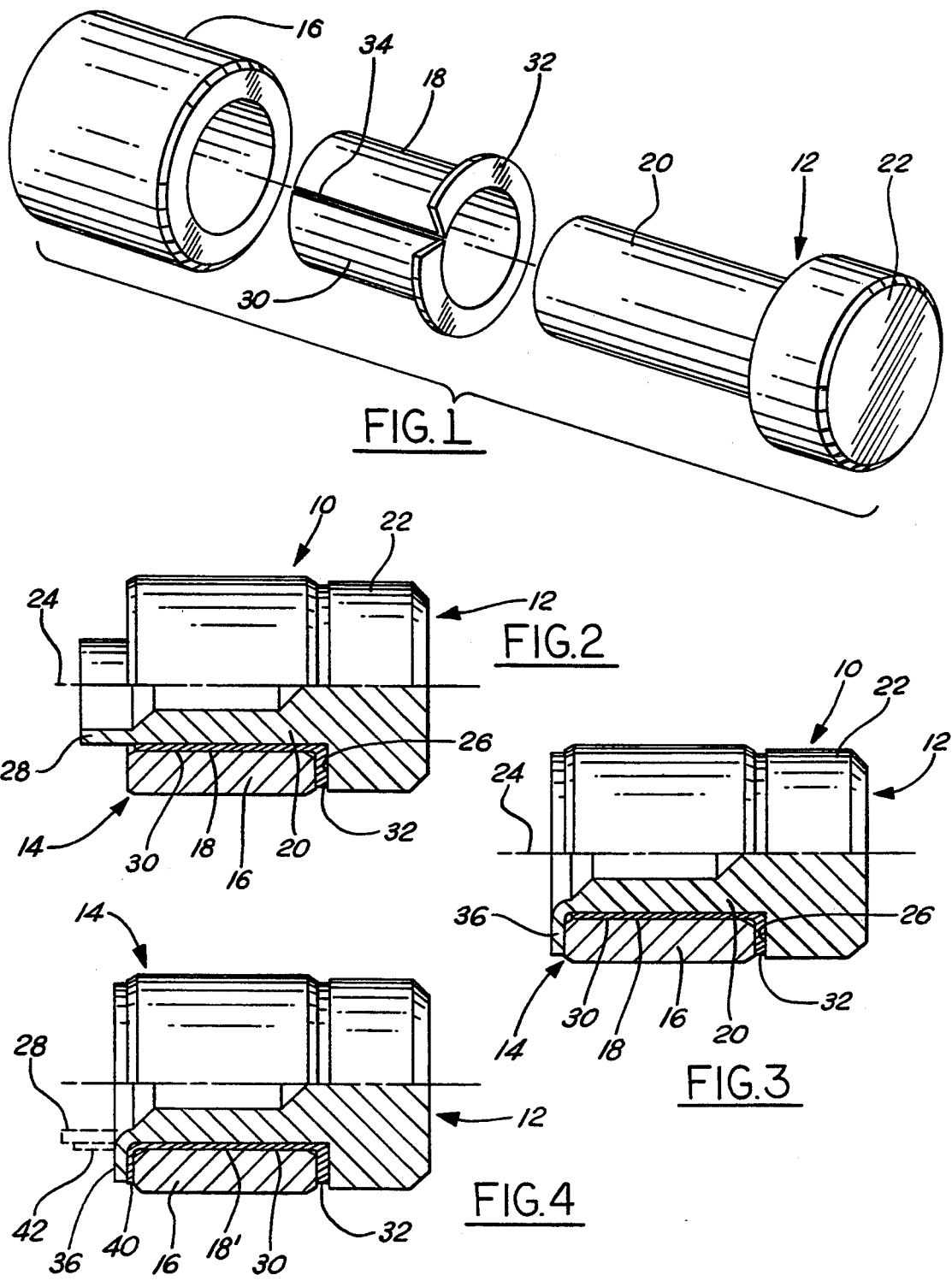

PIVOT/ROTATIONAL DEVICE

This invention relates generally to a pivot or rotational device.

BACKGROUND AND SUMMARY

Devices of this type often develop play or wobble after a brief period of use, if not immediately. The device of this invention is designed to overcome such problems.

In accordance with the present invention, the rotational device is comprised of a pivot pin and a two-part bushing assembly having an outer bushing ring and a bushing sleeve. The ring encircles the shank of the pin. The sleeve is formed of anti-friction material and is disposed between the ring and the pin shank to reduce friction and facilitate relative rotation. The sleeve has a radially outwardly extending collar at one end between the head of the pin and one end of the ring. The shank of the pin is tubular and its end opposite the head is flared radially outwardly by staking or the like to provide a flange which overlies the other end of the ring. The staking may be eliminated in some cases by making a relatively tight fit between the pin shank, bushing sleeve and bushing ring.

The anti-friction sleeve allows the pin to rotate in the ring, but the ring is restrained from axial movement between the sleeve collar and the pin shank flange. Hence, the pin and ring are capable of relative rotation, but without play or wobble. The sleeve may have a second collar between the flange on the pin shank and the ring, to further reduce friction.

It is an object of this invention to provide a pivot/rotational device having the foregoing features.

Other objects are to provide a pivot/rotational device which is composed of a relatively few simple parts, is inexpensive to manufacture and easy to assemble, and is rugged and durable in use.

These and other objects, features and advantages of the invention will become more apparent as the following description proceeds, especially when considered with the accompanying drawings.

BRIEF DESCRIPTION OF THE DRAWINGS

FIG. 1 is an exploded perspective view of the parts of the pivot rotational device of this invention.

FIG. 2 is a side elevational view, with parts in section, showing the device in a partially assembled condition.

FIG. 3 is a side elevational view, with parts in section, showing the device in its final assembled condition.

FIG. 4 is a side elevational view, with parts in section, showing a modification.

DETAILED DESCRIPTION

Referring now more particularly to the drawings, and especially FIGS. 1-3 thereof, the pivot/rotational device 10 comprises a pivot pin 12, and a two-part bushing assembly 14 comprising an outer bushing ring 16 and a bushing sleeve 18.

The pin 12 has an elongated shank 20 and an integral head 22 at one end of the shank. The shank 20 is hollow or tubular, being 25 closed at the head end and open at the end opposite the head. The provision of the open end permits insertion of servicing tooling for grasping and removing the unit from an assembly as desired. The radially outer surface of the shank is cylindrical and of uniform circular cross-section initially, but in its final assembled condition in the bushing assembly 14, the open end of the shank is turned or flared radially outwardly as by staking or the like as will be explained more fully hereinafter. The shank 20 is smaller in diameter than the head 22, which is this instance is also cylindrical as shown, and the head and shank have a common central axis 24, so that the head has an annular shoulder 26 which extends radially outwardly from the shank. The wall of the tubular shank is of reduced thickness at the open end where indicated at 28.

The ring 16 encircles shank 20 and has a cylindrical radially inner surface which is slightly larger in diameter than the radially outer surface of the shank 20.

The sleeve 18 is disposed concentrically between the ring 16 and shank 20. The sleeve is an open-ended tubular, cylindrical member preferably of uniform wall thickness from end to end. It may be made of standard anti-friction bushing material and good results can be obtained from parts supplied by Oiles America Corporation. The sleeve 18 has a cylindrical body portion 30 of uniform circular cross-section throughout its length, and at one end has a radially outwardly extending, substantially annular collar 32. For convenience, the sleeve, including both its body portion 30 and collar 32, may be longitudinally split from end to end where indicated at 34 in FIG. 1. The body portion 30 is of such inside and outside diameter as to fit snuggly between the shank 20 of pin 12 and the ring 16, in surface-to-surface contact with the radially outer surface of the shank and the radially inner surface of the ring.

To assemble the device 10, first the sleeve 18 is slipped axially, collared end first, over the open end of the shank of pin 12. The sleeve is advanced on the shank until its collar 32 contacts the shoulder 26 of head 22. Then the ring 16 is slipped axially over the open end of the shank and the sleeve, into contact with the collar 32 as shown in FIG. 2. Alternatively, the ring 16 and sleeve may first be assembled to form the two-part bushing assembly 14 which is then slipped on the shank of the pin.

With the parts in the FIG. 2 position, the reduced end 28 of the shank 20 is turned or staked radially outwardly to the FIG. 3 position, forming the annular flange 36. The flange 36 is thus deformed and takes a permanent set pressed against the end of the ring 16.

In the final assembled condition of FIG. 3, the cylindrical body portion 30 of sleeve 18 is disposed concentrically between the opposing surfaces of shank 18 and ring 16, in surface-to-surface contact therewith. The collar 32 of the sleeve is disposed between one end of ring 16 and the shoulder 26 of pin head 22 in surface-to-surface contact therewith. The flange 36 of the pin shank 20 presses in surface-to-surface contact against the other end of ring 16. The pin 12 is permitted to rotate relative to ring 16 by the anti-friction sleeve 18, and flange 36 does not press against ring 16 so hard as to prevent this. However, the ring is held snuggly between the flange 36 and collar 32 and accordingly any play or wobble between the pin 12 and ring 16 is virtually eliminated.

FIG. 4 shows a modification in which the sleeve 18' has a second integral collar 40 at the end of the body portion opposite collar 32, between the flange 36 and the end of ring 16. The collar 40 has surface-to-surface contact with both the ring end and the flange 36 and, being of an anti-friction material, further reduces friction between the relatively rotatable pin and ring. The collar 40 is formed during assembly of the parts, and as seen in phantom lines at 42 in FIG. 4, it is initially a straight line extension of the body portion 30 of the sleeve. The reduced end 28 of flange 20 and the extension 42 are simultaneously turned radially outwardly as by staking to the final solid line position forming the flange 36 and collar 40, Otherwise the FIG. 4 construction is like that of FIGS. 1-3.

What is claimed is:

1. A pivot/rotational device comprising:
   (a) a pivot pin having a head and a tubular, cylindrical shank of reduced diameter relative to and projecting from said head,
   (b) and a two-part bushing assembly comprising a ring and a sleeve,
   (c) said sleeve having opposite ends and being longitudinally split from end to end,
   (d) said sleeve being formed of anti-friction material and having a cylindrical body portion provided with first and second ends and encircling and in surface-to-surface contact with said shank,
   (e) said ring encircling and in surface-to-surface contact with said body portion of said sleeve and having first and second ends with said first end adjacent said head,
   (f) said sleeve having a radially outwardly extending collar at said first end of said body portion disposed between and in surface-to-surface contact with said head and said first end of said ring,
   (g) said tubular shank having an open end opposite said head,
   (h) said tubular shank having on said open end a radially outwardly extending flange of less thickness than said tubular shank,
   (i) said radially outwardly extending flange abutting said second end of said ring,
   (j) said ring being restrained from axial movement relative to said pin by said collar and head at said first end thereof and by said flange at said second end thereof,
   (k) said flange being flexible so that it may be formed initially as a cylindrical straight line extension of said tubular shank to facilitate assembly of said ring into said encircling relationship with respect to said body portion of said sleeve after which said flange may be turned radially outwardly into abutting relationship with said second end of said ring as aforesaid.

2. A pivot/rotational device comprising:
   (a) a pivot pin having a head and a tubular, cylindrical shank of reduced diameter relative to and projecting from said head,
   (b) and a two-part bushing assembly comprising a ring and a sleeve,
   (c) said sleeve having opposite ends and being longitudinally split from end to end,
   (d) said sleeve being formed of anti-friction material and having a cylindrical body portion provided with first and second ends and encircling and in surface-to-surface contact with said shank,
   (e) said ring encircling and in surface-to-surface contact with said body portion of said sleeve and having first and second ends with said first end adjacent said head,
   (f) said sleeve having a first radially outwardly extending collar at said first end of said body portion disposed between and in surface-to-surface contact with said head and said first end of said ring,
   (g) said sleeve having a second radially outwardly extending collar at said second end of said body portion overlying and abutting said second end of said ring,
   (h) said tubular shank having an open end opposite said head,
   (i) said tubular shank having on said open end a radially outwardly extending flange of less thickness than said tubular shank,
   (j) said radially outwardly extending flange overlying and abutting said second collar,
   (k) said ring being restrained from axial movement relative to said pin by said first collar and head at said first end thereof and by said second collar and flange at said second end thereof,
   (l) said flange and said second collar being flexible so that they may be formed initially as cylindrical straight line extensions of said shank and body portion of said sleeve, respectively, to facilitate assembly of said ring into encircling relationship with respect to said body portion of said sleeve after which said flange and second collar may be turned radially outwardly to axially restrain said ring as aforesaid.

* * * * *